(12) United States Patent
Tsumori et al.

(10) Patent No.: US 7,723,283 B2
(45) Date of Patent: May 25, 2010

(54) WATER-SOLUBLE AMPHOTERIC COPOLYMER, PRODUCTION METHOD THEREOF, AND APPLICATION THEREOF

(75) Inventors: Takahiro Tsumori, Nishinomiya (JP); Yoshikazu Fujii, Kyoto (JP); Daisuke Hattori, Hiroshima (JP)

(73) Assignee: Nippon Shokubai Co., Ltd., Osaka-shi (JP)

( * ) Notice: Subject to any disclaimer, the term of this patent is extended or adjusted under 35 U.S.C. 154(b) by 633 days.

(21) Appl. No.: 11/481,965

(22) Filed: Jul. 7, 2006

(65) Prior Publication Data

US 2007/0021313 A1    Jan. 25, 2007

(30) Foreign Application Priority Data

Jul. 8, 2005    (JP)    ............................. 2005-200372

(51) Int. Cl.
  *C11D 3/37* (2006.01)
  *C11D 1/88* (2006.01)
  *C08G 75/24* (2006.01)
  *C08G 73/02* (2006.01)

(52) U.S. Cl. ........................ 510/475; 510/477; 510/504; 525/42; 525/535; 525/540; 526/72; 526/222; 526/236

(58) Field of Classification Search ................. 510/475, 510/477, 504; 525/42, 535, 540; 526/72, 526/222, 236
See application file for complete search history.

(56) References Cited

U.S. PATENT DOCUMENTS 6,361,768 B1    3/2002    Galleguillos et al.

7,025,973 B2    4/2006    Loffler et al.
2005/0008534 A1*    1/2005    Hodge et al. .................. 422/28

FOREIGN PATENT DOCUMENTS

| EP | 0 013 836 A1 | 8/1980 |
| JP | 2002-533537 A | 10/2002 |
| WO | WO-97/22640 A1 | 6/1997 |
| WO | WO-02/43686 A2 | 6/2002 |
| WO | WO 2004/100666 | * 11/2004 |
| WO | WO-2004/100666 A1 | 11/2004 |

* cited by examiner

*Primary Examiner*—Brian P Mruk
(74) *Attorney, Agent, or Firm*—Connolly Bove Lodge & Hutz LLP

(57) ABSTRACT

To provide: a water-soluble amphoteric copolymer having excellent hydrophilicity and high adsorption capability, and capable of exhibiting dramatically excellent dispersibility even under high hardness conditions and being preferably used in a detergent composition application, for example; an application thereof; and a production method of such a water-soluble amphoteric copolymer. A water-soluble amphoteric copolymer produced by a copolymerization of a monomer component comprising a cationic monomer (a), an anionic monomer (b), and an unsaturated polyalkylene glycol monomer (c), wherein the monomer (b) is a carboxyl group-containing monomer and/or a sulfonic acid group-containing monomer (d), and the monomer (b) is more than 50% by mole relative to 100% by mole of a total amount of the monomers (a), (b), and (c) if the monomer (b) consists of the carboxyl-group containing monomer, and at least one species of monomer among the monomers (a), (d), and (c) is 30% by mole or less relative to 100% by mole of a total amount of the monomers (a), (d), and (c) if the monomer (b) comprises the sulfonic acid group-containing monomer (d).

11 Claims, No Drawings

WATER-SOLUBLE AMPHOTERIC COPOLYMER, PRODUCTION METHOD THEREOF, AND APPLICATION THEREOF

This application claims priority from Japanese Application 2005-200372, filed Jul. 8, 2005.

TECHNICAL FIELD

The present invention relates to a water-soluble amphoteric copolymer, a production method thereof, and an application thereof. More specifically, the present invention relates to: a water-soluble amphoteric copolymer having both a cationic group and an anionic group in the structure; a production method of the water-soluble amphoteric copolymer; a detergent composition, a detergent, and a liquid detergent in which the water-soluble amphoteric copolymer is used.

BACKGROUND ART

Water-soluble polymers have been widely used in various applications, because of the solubility, for example, in detergent compositions, scale inhibitors, dispersants for various inorganic or organic substances, thickeners, cohesive agents, adhesive agents, surface-coating agents, cross-linking agents, and moisturizers. As such water-soluble polymers, polymers produced by polymerizing an unsaturated carboxylic acid monomer such as an acrylic acid or copolymers of such an unsaturated carboxylic acid monomer with another monomer, and graft polymers produced by a graft polymerization of a polyether compound with an unsaturated carboxylic acid monomer such as acrylic acid, have been widely used conventionally. Various amphoteric copolymers having a cationic group and an anionic group in the structure have been recently investigated for exhibition of contradictory properties.

If such a water-soluble polymer is used in water system applications such as detergent compositions, scale inhibitors, and dispersants, needed performances are different from water qualities because the water qualities such as hardness, attributed o the kind of the water source vary by country, region, or the like. Therefore, development of agents sufficiently satisfying needed performances have been needed. If such a water-soluble polymer is used in a water system with high hardness, the polymer is deactivated due to influence of hardness components such as calcium ion, possibly failing to exhibit sufficient detergency, scale inhibiting capability, dispersibility, or the like. Therefore, an agent capable of sufficiently exhibiting such performances even under high hardness conditions has been needed.

With respect to a conventional amphoteric copolymer, disclosed is a hydrophilic amphoteric polymer formed by copolymerizing an anionic monomer having a carboxyl functional group, a cationic monomer having an amino functional group, a nonionic hydrophilic monomer, a hydrophobic monomer, and a crosslinking monomer (for example, referring to Japanese kohyo Publication No. 2002-533537 (page 2)). However, this hydrophilic amphoteric polymer has room for improvement in order to sufficiently exhibit performances such as detergency even under high hardness conditions and thereby to be useful in much more applications, particularly in water system applications such as detergent composition.

With respect to an antibacterial composition containing an amphoteric copolymer, disclosed is an amphoteric copolymer obtained by using methoxy polyethylene glycol monomethacrylate having an ethylene oxide unit, 2-acrylamide methylpropanesulfonic acid, and dimethylaminoethyl methacrylate in the molar ratio of 1:1:1 (for example, referring to WO 2004/100666 (page 33, Example 25, page 55)). However, this copolymer has room for improvement in order to be economically more excellent and preferable, for example, in water system applications such as detergent composition.

SUMMARY OF THE INVENTION

The present invention has been made in view of the above-mentioned state of the art. The present invention has an object to provide: a water-soluble amphoteric copolymer having excellent hydrophilicity and high adsorption capacity, and capable of exhibiting dramatically excellent dispersibility under high hardness conditions and being preferably used in a detergent composition application, for example; an application thereof; and a production method of such a water-soluble polymer.

The present inventors have made various investigations about water-soluble amphoteric copolymers. They have firstly found that if a cationic monomer and an anionic monomer, and further an unsaturated polyalkylene glycol monomer are used to be copolymerized, a copolymer excellent in adsorptivity, dispersibility, and compatibility can be obtained. They have found that the obtained water-soluble amphoteric polymer can exhibit dramatically excellent dispersibility even under high hardness conditions, and can be economically excellent and useful in various applications if a carboxyl group-containing monomer and/or a sulfonic acid group-containing monomer are/is used as the anionic monomer and the molar ratio of the monomer components is specified depending on the species of the anionic monomer to be use. Then, they have found that such a water-soluble amphoteric copolymer can exhibit excellent detergency even under high hardness conditions if used in a detergent composition application, for example. Thereby, the above-mentioned problems have been solved. They have also found that the monomer components can be polymerized with high efficiency and the obtained water-soluble amphoteric copolymer has a preferable molecular weight if such a water-soluble amphoteric copolymer is obtained by a polymerization using a chain transfer agent, and therefore functional effects attributed to the copolymer can be exhibited enough. Thereby, the present invention has been completed.

That is, the present invention relates to a water-soluble amphoteric copolymer produced by a copolymerization of a monomer component comprising a cationic monomer (a), an anionic monomer (b), and an unsaturated polyalkylene glycol monomer (c), wherein the monomer (b) comprises a carboxyl group-containing monomer and/or a sulfonic acid group-containing monomer (d), and the monomer (b) is more than 50% by mole relative to 100% by mole of a total amount of the monomers (a), (b), and (c) if the monomer (b) consists of the carboxyl-group containing monomer, and at least one species of monomer among the monomers (a), (d), and (c) is 30% by mole or less relative to 100% by mole of a total amount of the monomers (a), (d), and (c) if the monomer (b) comprises the sulfonic acid group-containing monomer (d).

DETAILED DESCTIPTION OF THE INVENTION

The present invention is described in more detail below. The water-soluble amphoteric copolymer of the present invention is produced by a copolymerization of a monomer component comprising a cationic monomer (a) (hereinafter, also referred to as "monomer (a)"), an anionic monomer (b) (hereinafter, also referred to as "monomer (b)"), and an unsaturated polyalkylene glycol monomer (c) (hereinafter, referred to as "monomer (c)") One or two or more species of each of the components can be used. However, such a water-soluble amphoteric copolymer has no embodiment in which the content ratio in the above-mentioned monomer component (cationic monomer (a)/anionic monomer (b)/unsaturated polyalkylene glycol monomer (c)) is 1/1/1. The water-soluble amphoteric copolymer of the present invention may contain another monomer component unless the functional effects of the present invention are sacrificed. The present invention and the component(s) of the present invention may suitably comprise, consist of, or consist essentially of the element(s)

In the present invention, the monomer (b) is more than 50% by mole relative to 100% by mole of a total amount of the monomers (a), (b), and (c) if the monomer (b) consists of (comprises only or consists essentially of) the carboxyl-group containing monomer.

In the above-mentioned monomer component, the cationic monomer (a) has a cationic group in the molecule. The cationic group may be an amiono group and an imino group, for example. The monomer (a) may have one or two or more species of such cationic groups in one molecule. If the monomer (a) has two or more cationic groups, the cationic groups may be the same species, or may be two or more species. Among them, the monomer (a) is preferably a monomer having at least an amino group. Thereby, the adsorptivity can be exhibited enough. As mentioned above, preferable embodiments of the present invention include an embodiment in which the above-mentioned cationic monomer (a) is an amino group-containing monomer.

The following monomers may be mentioned as the above-mentioned amino group-containing monomer, for example. One or two or more species of them may be used.

Dialkylaminoalkyl(meth)acrylates, such as N,N-dimethylaminomethyl(meth)acrylate, N,N-diethylaminomethyl(meth)acrylate, N,N-dimethylaminoethyl(meth)acrylate, and N,N-diethylaminoethyl(meth)acrylate; dialkylaminohydroxyalkyl(meth)acrylates, such as dimethylaminohydroxypropyl(meth)acrylate; dialkylaminoalkyl (meth)acrylamides, such as dimethylaminoethyl(meth)acrylamide, N,N-dimethylaminopropylacrylamide, and N,N-diethylaminopropylacrylamide; dialkylaminohydroxyalkyl (meth)acrylamides, such as dimethylaminohydroxypropyl (meth)acrylamide; vinyl pyrrolidones; imidazole-containing unsaturated monomers, such as 1-vinyl imidazole and 1-vinyl-2-methyl imidazole; pyridine-containing unsaturated vinyl monomers, such as 2-vinylpyridine, 3-vinylpyridine, 4-vinylpyridine, and 3-(2-(meth)acryloxy)ethoxycarbonyl pyridine;

(meth)acryloyloxyethyltrimethylammonium halides or sulfates thereof, such as (meth)acryloyloxyethyltrimethylammonium chloride or bromide, and (meth)acryloyloxyethyltrimethylammonium methyl sulfate; (meth) acryloyloxyhydroxyethyltrimethyl ammonium halides or sulfates thereof, such as (meth)acryloyloxyhydroxyethyltrimethyl ammonium chloride; dialkylaminoalkyl(meth)acrylamide halides or sulfates thereof; dialkylaminohydroxyalkyl (meth)acrylamide halides or sulfates thereof; N-alkylvinylpyridinium halides, such as N-methyl-2-vinylpyridinium chloride; trialkylallylammonium halides, such as dimethyldiallylammonium chloride.

These may be also hydrochlorides, citrates, oxalates, or the like. Compounds quaterized with a quaternizing agent, such as alkyl halides, may be mentioned as the halides, for example. The alkyl halides may be, for example, methyl chlorides, ethyl chlorides, ethyl bromides, methyl bromides, methyl iodides, benzyl chlorides.

(N,N-dimethylamino)ethyl(meth)acrylate, and (meth) acryloyloxyethyltrimethylammonium halides or sulfates thereof are preferable among the above-mentioned amino group-containing monomers. Thereby, the obtained copolymer can exhibit more excellent adsorptivity, and therefore can be used in a detergent composition application, for example. Preferable embodiments of the present invention include such an embodiment in which the amino group-containing monomer is at least one species of monomer selected from the group consisting of (N,N-dimethylamino)ethyl(meth)acrylate, (meth)acryloyloxyethyltrimethylammonium halides, and (meth)acryloyloxyethyltrimethylammonium sulfate.

The following formulae show (N,N-dimethylamino)ethyl (meth)acrylate and [2-(methacrylyoxy)ethyl]trimethylammonium chloride, respectively.

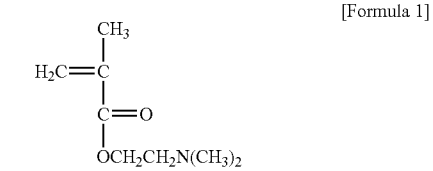

DAM: (N,N-dimethylamino)ethyl methacrylate

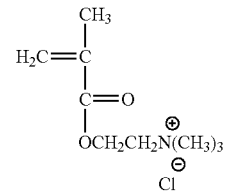

4DAM: [2-(methacrylyoxy) ethyl] trimethyl ammonium chloride

The above-mentioned anionic monomer (b) preferably comprises a carboxyl group-containing monomer and/or a sulfonic acid group-containing monomer (d).

Preferred examples of the above-mentioned carboxyl group-containing monomer include (meth)acrylic acid, maleic acid, maleic anhydride, fumaric acid, citraconic acid, itaconic acid, hydroxymethyl(meth)acrylic acid and salts thereof. Among them, (meth)acrylic acid, maleic acid, and maleic anhydride are preferable. One or two or more species of them may be used.

Metal salts, ammonium salts and organic amine salts are preferable as the above-mentioned salts. Preferred examples of metal atoms forming the metal salts include monovalent metal atoms of alkali metal atoms such as lithium, sodium, and potassium; bivalent metal atoms of alkaline earth metal atoms such as calcium and magnesium; trivalent metal atoms such as aluminum and iron. The organic amine salts are preferably alkanolamines salts such as ethanolamine salts, diethanolamine salts, and triethanolamine salts, and triethylamines.

Examples of the above-mentioned sulfonic acid group-containing monomer (d) include vinyl sulfonic acid, (meth) allyl sulfonic acid, isoprene sulfonic acid, styrene sulfonic acid, 2-acrylamide-2-methylpropanesulfonic acid, 3-(meth) allyloxy-2-hydroxypropanesulfonic acid, 3-(meth)-allyloxy-1-hydroxypropane-2-sulfonic acid, 3-(meth)acryloxy-2-(poly)oxyethylene ether propanesulfonic acid, 3-(meth) acryloxy-2-(poly)oxypropylene ether propanesulfonic acid, 3-allyloxy propane-1,2-diol sulfonate, 3-allyoxy-1,2-di (poly)oxyethylene ether propanesulfonate, 3-allyloxy-1,2-di (poly)oxypropylene ether propanesulfonate, 3-allyloxy-2-(poly)oxyethylene propanesulfonic acid, 6-allyloxyhexane-1,2,3,4,5-pentaol sulfonate, 3-allyloxy-2-hydroxypropanesulfonic acid, 3-allyloxy-2-(poly)oxypropylenepropanesulfonic acid, sulfoethyl(meth) acrylate, sulfopropyl(meth)acrylate, 2-hydroxysulfopropyl (meth)acrylate, sulfoethylmaleimide, and salts thereof; and phosphates or sulfates of these compounds and salts thereof.

Metal salts, ammonium salts, and organic amine salts are preferable as the salts. Preferable embodiments of the metal atoms forming the metal salts and the organic amine salts are as mentioned above.

The above-mentioned sulfonic acid group-containing monomer (d) is preferably a monomer having no ester bonds. More preferably, the sulfonic acid group-containing monomer (d) is at least one species of monomer selected from the group consisting of 2-acrylamide-2-methylpropanesulfonic acid and salts thereof, 3-(meth)allyloxy-2-hydroxypropanesulfonic acid and salts thereof, and 3-(meth)allyloxy-1-hydroxypropane-2-sulfonic acid and salts thereof. Thereby, the obtained copolymer can more sufficiently exhibit dramatically excellent dispersibility even under high hardness conditions. And the copolymer is resistant to hydrolysis because of the absence of the ester bond, and therefore can prevent reduction in detergency, caused by ester hydrolysis, if used in a detergent composition application, for example. The following formulae show 2-acrylamide-2-methylpropanesulfonic acid and 3-(meth)allyloxy-2-hydroxypropanesulfonic acid, respectively.

[Formula 2]

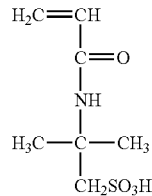

AMPS: 2-acrylamide-2-methylpropanesulfonic acid

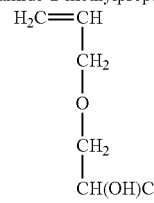

HAPS: 3-allyloxy-2-hydroxypropane sulfonic acid

It is preferable that the above-mentioned anionic monomer (b) essentially comprises the sulfonic group-containing monomer (d). Thereby, the obtained copolymer can more sufficiently exhibit dramatically excellent dispersibility even under high hardness conditions. More preferably, the carboxyl group-containing monomer and the sulfonic acid-group containing monomer (d) are used in combination. In this case, a copolymer having more excellent dispersibility can be obtained at low costs.

If the carboxyl group-containing monomer and the sulfonic acid group-containing monomer (d) are used in combination, the molar ratio of them (the carboxyl group-containing monomer/the sulfonic acid group-containing monomer (d)) is preferably 10 to 90/90 to 10. The molar ratio of the carboxyl group-containing monomer to the sulfonic acid group-containing monomer (d) is more preferably 15 to 85/85 to 15, and still more preferably 20 to 80/80 to 20, and particularly preferably 25 to 75/75 to 25.

For example, monomers represented by the following formulae (1) to (4) are preferable as the above-mentioned unsaturated polyalkylene glycol monomer (c). The unsaturated polyalkylene glycol monomer (c) may be used as it is, or may be used in a form of an aqueous solution.

[Formula 3]

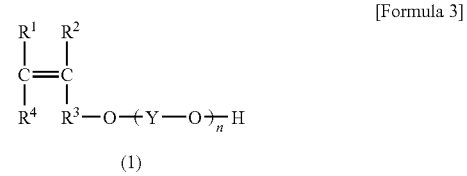

(1)

(In the formula, $R^1$, $R^2$, and $R^4$ are the same or different, and each represent a hydrogen atom or a methyl group, and $R^1$ (or $R^4$) and $R^2$ are not methyl groups at the same time. $R^3$ represents $-CH_2-$, $-(CH_2)_2-$, or $C(CH_3)_2-$. A total number of the carbon atoms in $R^1$, $R^2$, $R^3$, and $R^4$ is 3. Y represents an alkylene group containing 2 to 18 carbon atoms. n is an integer of 1 to 300.)

[Formula 4]

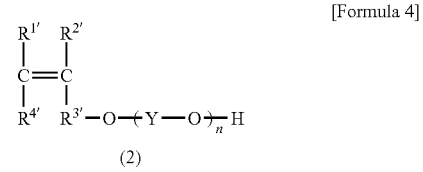

(2)

(In the formula, $R^{1'}$, $R^{2'}$, and $R^{4'}$ are the same or different, and each represent a hydrogen atom or a methyl group, and $R^{1'}$ (or $R^{4'}$) and $R^{2'}$ are not methyl groups at the same time. $R^{3'}$ represents $-CH_2-$, $-(CH_2)_2-$. A total number of the carbon atoms in $R^{1'}$, $R^{2'}$, $R^{3'}$, and $R^{4'}$ is 2. Y represents an alkylene group containing 2 to 18 carbon atoms. n is an integer of 1 to 300.)

[Formula 5]

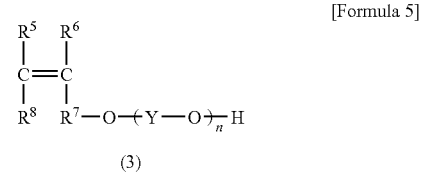

(3)

(In the formula, $R^5$, $R^6$, and $R^8$ are the same or different, and each represent a hydrogen atom or a methyl group. $R^7$ represents a hydrogen atom or $-CH_2-$. A total number of the carbon atoms in $R^5$, $R^6$, $R^7$, and $R^8$ is 1. Y represents an alkylene group containing 2 to 18 carbon atoms. n is an integer of 1 to 300.)

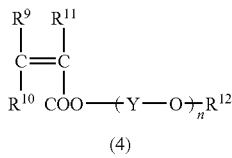

(4)

(In the formula, $R^9$, $R^{10}$, and $R^{11}$ are the same or different, and each represent a hydrogen atom or a methyl group, and $R^9$ (or $R^{10}$) and $R^{11}$ are not methyl groups at the same time. $R^{12}$ represents a hydrogen atom or a hydrocarbon group containing 1 to 30 carbon atoms. Y represents an alkylene group containing 2 to 18 carbon atoms. n is an integer of 1 to 300.)

Y in the above formulae (1) to (4) represents an alkylene group containing 2 to 18 carbon atoms. Specifically, styrene oxides, ethylene oxides (EO), and propylene oxides may be mentioned for example. Such oxides may be one or two or more species. Among them, ethylene oxides and/or propylene oxides are/is preferably used. Thereby, the obtained copolymer can retain excellent hydrophilicity and compatibility, and can exhibit more sufficient dispersibility. Therefore, the copolymer can sufficiently prevent soils from adhering to a cloth and the like, and thereby improve the detergency if used in a detergent composition application, for example. If Y represents two or more species of alkylene groups, the bonding order of the alkylene groups is not especially limited.

The above-mentioned n representing a molar number of addition of the alkylene oxide is preferably 1 to 300. If the molar number of addition of the alkylene oxide is less than 1 mole, that is, if the alkylene oxide is not added, the obtained copolymer may exhibit insufficient hydrophilicity or compatibility. If the molar number of addition of the alkylene oxide is more than 300 moles, functional effects of the present invention is not improved, which may just result in need of a great additional amount of the alkylene oxide. The molar number of addition of the alkylene oxide is more preferably 5 to 100 moles.

The monomer represented by the above formula (1) is preferably a monomer obtained by adding an alkylene oxide to an unsaturated alcohol such as 3-methy-3-butene-1-ol, 3-methy-2-butene-1-ol, and 2-methy-3-butene-2-ol. The monomer represented by the above formula (3) is preferably a monomer obtained by adding an alkylene oxide to an allyl alcohol, and the like. The monomer represented by the above formula (4) is preferably an ester compound of a (meth) acrylic acid with a polyethylene glycol (PEG).

The following formulae show 3-methyl-3-butene-1-ol EO adduct, allyl alcohol EO adduct, and methoxy polyethylene glycol methacrylic acid ester, respectively.

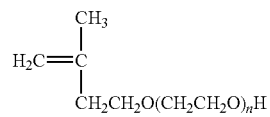

IPN: 3-methyl-3-butene-1-ol EO adduct

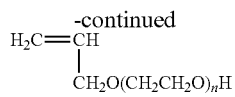

PEA: allyl alcohol EO adduct

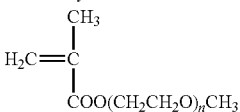

PGM-E: methoxy polyethylene glycol methacrylic acid ester

It is preferable that the used amount of each monomer in the above-mentioned monomer component is appropriately determined depending on the species of the anionic monomer (b) to be used.

Specifically, it is preferable that the anionic monomer (b) is more than 50% by mole relative to 100% by mole of a total amount of the monomers (a), (b), and (c) if the monomer (b) consists of the carboxyl-group containing monomer. If the monomer (b) is 50% by mole or less, the obtained copolymer may exhibit insufficient dispersibility under high hardness conditions, and may not be useful in a detergent composition application, for example. The monomer (b) is preferably 60% by mole or more, and more preferably 65% by mole or more.

It is preferable that at least one species of monomer among the monomers (a), (d), and (c) is 30% by mole or less relative to 100% by mole of a total amount of the monomers (a), (d), and (c) if the anionic monomer (b) consists of (comprises only or consists essentially of) the sulfonic acid group-containing monomer (d). Among them, it is preferable that the above-mentioned sulfonic acid group-containing monomer (d) is 30% by mole or less. Thereby, the water-soluble amphoteric copolymer of the present invention exhibits excellent performances and such a copolymer can be produced at lower costs.

As mentioned above, preferable embodiments of the present invention include an embodiment in which the anionic monomer (b) comprises the sulfonic acid group-containing monomer (d), and the monomer (d) is 30% by mole or less relative to 100% by mole of a total amount of the monomers (a), (d), and (c). The monomer (d) is more preferably 28% by mole or less, and still more preferably 25% by mole or less. The lower limit of the amount of the monomer (d) is preferably 3% by mole, and more preferably 5% by mole for improvement in the dispersibility under high hardness conditions.

The used amount of the above-mentioned cationic monomer (a) is preferably 1% by mole or more and 98% by mole or less relative to 100% by mole of a total amount of the monomers (a), (b), and (c). If the used amount of the cationic monomer (a) is less than 1% by mole, the detergency to hydrophobic soils may be insufficient if the obtained copolymer is used in a detergent composition application. If the used amount is more than 98% by mole, the compatibility with liquid detergents may be insufficient. The lower limit of the used amount is more preferably 5% by mole. The upper limit thereof is more preferably 90% by mole.

It is also preferable that, in the above-mentioned cationic monomer (a), the molar amount of the cationic monomer (a) to be used is equal to or greater than that of the unsaturated polyalkylene glycol monomer (c) to be used. If the molar amount of the cationic monomer (a) to be used is smaller than that of the unsaturated polyalkylene glycol monomer to be used, the adsorption capability to soils may not be improved. Thereby, the detergency may not be enhanced.

It is preferable that the used amount of the above-mentioned unsaturated polyalkylene glycol monomer (c) is 0.1% by mole or more and 98% by mole or less, relative to 100% by mole of a total amount of the monomers (a), (b), and (c). If the used amount of the unsaturated polyalkylene glycol monomer (c) is less than 0.1% by mole, the compatibility with liquid detergents may be insufficient, for example. If the used amount is more than 98% by mole, the dispersibility is reduced under high hardness condition, and thereby the detergency may be insufficient, if the obtained copolymer is used in a detergent composition application, for example. The upper limit of the used amount of the unsaturated polyalkylene glycol monomer (c) is more preferably 60% by mole. Thereby, the dispersibility and the adsorptivity are further improved, which makes it possible to enhance the detergency.

The above-mentioned monomer component may contain another monomer. The another monomer is not especially limited, and conventionally used monomers may be used. Examples of another monomer include styrene; vinyl acetate; (meth)acrylonitrile; (meth)acrylamide; methyl(meth)acrylate; ethyl(meth)acrylate; butyl(meth)acrylate; 2-ethylhexyl (meth)acrylate; dimethyl maleate, diethyl maleate, dibutyl maleate; dimethyl fumarate, diethyl fumarate, dibutyl fumarate; allyl alcohol; 3-methy-3-butene-1-ol; 3-methyl-2-butene-1-ol; 2-methyl-3-butene-2-ol; 3-(meth)acryloxy-1,2-dihydroxypropane; 3-(meth)acryloxy-1,2-di(poly)oxyethylene ether propane; 3-(meth)acryloxy-1,2-di(poly)oxypropylene ether propane; 3-(meth)acryloxy-1,2-dihydroxypropane phosphate, and monovalent metal salts thereof, bivalent metal salts thereof, ammonium salts thereof, organic amine salts thereof, or, monoesters or diesters with an alkyl group containing 1 to 4 carbon atoms; 3-(meth)acryloxy-1,2-dihydroxypropane sulfate and monovalent metal salts thereof, bivalent metal salts thereof, ammonium salts thereof, organic amine salts thereof, or esters with an alkyl group containing 1 to 4 carbon atoms; 3-allyloxypropane-1,2-diol; 3-allyloxypropane-1,2-diol phosphate; 3-allyloxypropane-1,2-diol sulfate; 3-allyloxy-1,2-di(poly)oxyethylene ether propane; 3-allyloxy-1,2-di(poly)oxyethylene ether propane phosphate; 3-allyloxy-1,2-di(poly)oxypropylene ether propane; 3-allyloxy-1,2-di(poly)oxypropylene ether propane phosphate; 6-allyloxyhexane-1,2,3,4,5-pentaol; 6-allyloxyhexane-1,2,3,4,5-pentaol phosphate; 6-allyloxyhexane-1,2,3,4,5-penta(poly)oxyethylene ether hexane; 6-allyloxyhexane-1,2,3,4,5-penta(poly)oxypropylene ether hexane; pyrolidone; hydroxymethyl(meth)acrylic ester. One or two or more species of them may be used.

The content ratio of the above-mentioned another monomer is not especially limited and preferably 30% by weight or less in 100% by weight of the whole monomer component, for example. If the content ratio is more than 30% by weight, the dispersibility under high hardness conditions is reduced, possibly resulting in insufficient detergency if the copolymer is used in a detergent composition application. The content ratio is more preferably 20% by weight or less, and still more preferably 10% by weight or less.

The water-soluble amphoteric copolymer of the present invention preferably has a weight average molecular weight of 1000 to 1000000. Thereby, the copolymer can exhibit more excellent detergency if used in a detergent composition application, for example. The water-soluble amphoteric copolymer more preferably has a weight average molecular weight of 1500 to 200000, and still more preferably 2000 to 50000.

The above-mentioned weight average molecular weight can be determined by, for example, gel permeation chromatography (GPC) under the following conditions.

<Measurement of Weight-average Molecular Weight (GPC Analysis)>

Device: produced by Showa Denko K. K., "Shodex-GPC SYSTEM-21"
Detecting element: RI
Column: produced by Showa Denko K. K., SHODEX Asahipak GF-310-HQ, GF-710-HQ
Column temperature: 40° C.
Flow rate: 0.5 ml/min
Calibration curve: polyethylene glycol standard sample (product of GL Sciences Inc.)
Eluent: 0.1N sodium acetate/acetonitrile=7/3 (ratio by weight)

The residual amount of the cationic monomer (a) in the above-mentioned water-soluble amphoteric copolymer is preferably 10% by weight or less relative to 100% by weight of the added amount of the cationic monomer (a). If the residual amount is more than 10% by weight, the adsorption capability may be insufficiently improved. Thereby, the detergency may not be more excellent if the copolymer is used in a detergent composition application, for example. More preferably, the residual amount is 5% by weight or less.

The residual amount of the carboxyl group-containing monomer is preferably 10% by weight or less relative to 100% by weight of the added amount of the carboxyl group-containing monomer if the carboxyl group-containing monomer is used as the anionic monomer (b). If the residual amount is more than 10% by weight, the copolymer may not be excellent in safety. And the content of the carboxyl group in the copolymer decreases, and thereby the dispersibility is insufficient, possibly leading to reduction in the detergency. Further, if the copolymer is used in an aqueous solution, the residual carboxyl group-containing monomer may be insoluble depending on pH of the solution. The residual amount is more preferably 5% by weight or less, and still more preferably 3% by weight or less. The residual amount of the sulfonic acid group-containing monomer (d) is preferably 15% by weight or less relative to 100% by weight of the added amount of the sulfonic acid group-containing monomer (d) if the sulfonic acid group-containing monomer (d) is used as the anionic monomer (b). If the residual amount is more than 15% by weight, the copolymer may not be excellent in safety. And the content of the sulfonic acid in the copolymer decreases, and thereby the dispersibility is insufficient, possibly leading to reduction in the detergency. Further, if the copolymer is used in an aqueous solution, the residual sulfonic acid group-containing monomer may be insoluble depending on pH of the solution. More preferably, the residual amount is 10% by weight or less.

The residual amount of the unsaturated polyalkylene glycol monomer (c) is preferably 40% by weight or less relative to 100% by weight of the added amount of the unsaturated polyalkylene glycol monomer (c). If the residual amount is more than 40% by weight, the amount of effective components in the copolymer decreases, and thereby the physical properties such as dispersibility and compatibility with liquid detergents may be insufficient. Also, the unsaturated polyalkylene glycol monomer (c) has reactivity, and therefore may be changed with time. More preferably, the residual amount is 30% by weight or less.

The water-soluble amphoteric copolymer of the present invention is produced by a copolymerization of the monomer component comprising the cationic monomer (a), the anionic monomer (b), and the unsaturated polyalkylene glycol monomer (c) in the presence of an initiator. Among them, it is particularly preferable that the copolymerization is performed using at least a chain transfer agent as the initiator. Thereby, the obtained copolymer is sufficiently suppressed from having a high molecular weight, and the polymerization efficiency is improved. Therefore, a copolymer capable of exhibiting more excellent performances can be obtained. As mentioned above, the present invention includes a production method of the water-soluble amphoteric copolymer, wherein the production method comprises a step of performing the copolymerization using a chain transfer agent.

In the above-mentioned copolymerization step, the method of the polymerization reaction is not especially limited. For example, the polymerization reaction may be performed by conventional polymerization methods such as solution polymerization, emulsion polymerization, suspension polymerization, and precipitation polymerization. Among them, the solution polymerization is preferable. The method of the solution polymerization is not especially limited and may be a conventional method. For example, mentioned may be a polymerization method in a solvent such as water, and a mixed solvent of water and an organic solvent or a water-soluble organic solvent. The organic solvent is not especially limited, and one or two or more species of solvents mentioned below can be used, for example.

Conventionally used chain transfer agents may be used as the above-mentioned chain transfer agent. Examples of the chain transfer agent include: hydrophilic chain transfer agents, for example, thiol chain transfer agents such as mercaptoethanol, thioglycerol, thioglycolic acid, 3-mercaptopropionic acid, thiomalic acid, and 2-mercaptoethanesulfonic acid; phosphorus chain transfer agents such as phosphorous acid, phosphinic acid and salts thereof (sodium hypophosphite, phosphinic acid potassium, and the like), secondary alcohols such as isopropyl alcohol; and lower oxides and salts thereof such as sulfurous acid, hydrogen sulfite, dithionic acid, metabisulfurous acid and salts thereof (sodium sulfite, sodium hydrogensulfite, sodium dithionite, sodium metabisulfite, and the like); and hydrophobic chain transfer agents, for example, thiol chain transfer agents having a hydrocarbon group containing 3 or more of carbon atoms such as butane thiol, octane thiol, decane thiol, dodecane thiol, hexadecane thiol, octadecane thiol, cyclohexyl mercaptan, thiophenol, thioglycolic acid octyl, and 3-mercaptopropionic acid octyl. One or two or more species of them may be used. Among them, thiol chain transfer agents and phosphorus chain transfer agents are preferably used. Thereby, the polymerization efficiency can be enhanced. As mentioned above, preferable embodiments of the present invention include an embodiment in which the chain transfer agent is a thiol chain transfer agent and/or a phosphorus chain transfer agent.

The used amount of the above-mentioned chain transfer agent is not especially limited. For example, 0.1 to 30 parts by weight of the chain transfer agent is preferably used, relative to 100 parts by weight of the whole monomer component used in the copolymerization. If the used amount is less than 0.1 parts by weight, the obtained copolymer has a high molecular weight, and therefore the detergency may not be excellent. If the used amount is more than 30 parts by weight, the production method may be economically inefficient. The used amount of the chain transfer agent is more preferably 0.5 to 20 parts by weight.

A polymerization initiator may be used in the above-mentioned copolymerization step. The polymerization initiator is not especially limited, and conventionally used polymerization initiators may be used. A peroxide is particularly preferably used. Examples of the peroxide include persulfates such as ammonium persulfate, sodium persulfate, and potassium persulfate; hydrogen peroxides; ketone peroxides such as methyl ethyl ketone peroxide and cyclohexanone peroxide; hydroperoxides such as t-butyl hydroperoxide, cumene hydroperoxide, diisopropyl benzene hydroperoxide, p-menthane hydroperoxide, 2,5-dimethyl hexane-2,5-dihydroperoxide, and 1,1,3,3-tetramethylbutyl hydroperoxide; dialkylperoxides such as di-t-butyl peroxide, t-butyl cumyl peroxide, dicumyl peroxide, and α,α'-bis(t-butylperoxy)p-diisopropylhexyne; peroxyesters such as t-butyl peroxyacetate, t-butyl peroxylaurate, t-butyl peroxybenzoate, di-t-butyl peroxyisophthalate, 2,5-dimethyl-2,5-di(benzoyl peroxy)hexane, and t-butylperoxyisopropyl carbonate; peroxyketals such as n-butyl-4,4-bis(t-butylperoxy)valerate and 2,2-bis(t-butylperoxy)butane; and diacyl peroxides such as dibenzoyl peroxide. One or two or more species of them may be used.

The above-mentioned polymerization initiator may be used as the initiator singly in the present invention, but preferably used in combination with a chain transfer agent. Among them, preferable embodiments of the present invention include an embodiment in which the peroxide and the chain transfer agent are used in combination. In this case, the obtained copolymer is sufficiently suppressed from having a high molecular weight, and the polymerization of each of the monomer components can be efficiently performed. Therefore, the residual amount of each of the monomer components can be sufficiently reduced. Accordingly, the obtained copolymer can exhibit more excellent performances.

With respect to the ratio by weight of the polymerization initiator to the chain transfer agent in the combined use of them, it is preferable that the lower limit of the chain transfer agent is 30 parts by weight and the upper limit thereof is 300 parts by weight relative to 100 parts by weight of the polymerization initiator. More preferably, the lower limit is 50 parts by weight and the upper limit is 200 parts by weight.

A solvent may be used in the above-mentioned copolymerization. The solvent is not especially limited and conventionally used solvents may be used. Examples of the solvent include water; alcohols; ethers; ketones; esters; amides; sulfoxides; and hydrocarbons. These may be used singly or in combination of two or more species of them. Among them, preferred are water, methyl alcohol, ethyl alcohol, n-propyl alcohol, isopropyl alcohol, t-butyl alcohol, methyl cellosolve, ethyl cellosolve, butyl cellosolve, acetone, methyl ethyl ketone, tetrahydrofuran, 1,4-dioxane, 1,3-dioxolane, toluene, ethyl acetate, and mixed solvents thereof. Water is particularly preferable. These solvent may contain organic amines, ammonia, and the like, for neutralization of the carboxylic acid or the sulfonic acid or for pH control. An alkali metal hydroxide may be used in a solvent containing water.

The used amount of the above-mentioned solvent is not especially limited, and preferably set such that the polymerization concentration is within a preferable range mentioned below. Specifically, the used amount of the solvent is preferably 5 to 900 parts by weight, relative to 100 parts by weight of a total amount of the monomer component. The used amount of the solvent is more preferably 25 to 800 parts by weight. The above-mentioned solvent may be charged in one step initially or added sequentially.

With respect to reaction conditions at the above-mentioned copolymerization, the reaction temperature is not especially limited, and preferably 0 to 200° C., and more preferably 25 to 150° C., and still more preferably 50 to 130° C., and particularly preferably 70 to 100° C. Thereby, the copolymer having a more preferable molecular weight can be produced, and an amount of impurities can be reduced and the polymerization time can be shortened more sufficiently. Therefore, such a production method can be more excellent in productivity. The reaction pressure is not especially limited either, and the reaction may be performed under ordinary pressure (atmospheric pressure), reduced pressure, or pressurization. The copolymerization is preferably performed under ordinary pressure (atmospheric pressure) because the copolymerization can be performed simply and at low costs. Further, the above-mentioned copolymerization is preferably performed under inert gas atmosphere such as nitrogen gas, argon gas, and $CO_2$ gas. However, the condition is not especially limited to the above.

It is preferable that the polymerization concentration is 10% by weight or more in the above-mentioned copolymerization. Thereby, the polymerization efficiency is improved. Therefore, the residual amount of each of the monomer components can be sufficiently reduced, which makes it possible to produce a water-soluble amphoteric copolymer more excellent in various performances. More preferably, the polymerization concentration is 15% by weight or more. The polymerization is performed using the chain transfer agent in the present invention, as mentioned above. Therefore, even under such a concentration condition, a copolymer having a low molecular weight can be produced (most preferable weight average molecular weight is 2000 to 50000).

The above-mentioned polymerization concentration means a concentration of the solid content in the solution, that is, a concentration of the solid content in the polymerization reaction system (for example, the concentration of the polymer solid content of the monomer) upon termination of the polymerization reaction. The "upon termination of the polymerization reaction" may be after termination of each dropwise addition of the above-mentioned components. More specifically, it may be after the reaction solution into which each of the above-mentioned components has been added dropwise is maintained (matured).

In the above-mentioned copolymerization step, a total amount of each component such as the monomer components and the initiator (including the chain transfer agent) may be added dropwise, or part or a total amount of each component may be previously added in a reaction system. When added dropwise, a liquid component may be added as it is, or may be dissolved in a solvent (preferably water) and then added dropwise. A solid component is preferably dissolved in a solvent (preferably water) or melted, and then added dropwise.

The method of the addition of the monomer components and the initiator into the reaction system is not especially limited, and may be a conventional method. It is preferable that the monomer components may be added separately or as a mixture, into the reaction system continuously or intermittently with a solvent or separately from a solvent. More preferably, the monomer components may be added continuously. Also in the initiator, it is preferable that the initiator is continuously or intermittently added with a solvent or separately from a solvent. More preferably, the initiator is continuously added. The method of the addition may include an embodiment in which the monomer components and the initiator are added and then only the initiator is added.

The time taken for addition of the above-mentioned monomer components or the above-mentioned initiator (including the chain transfer agent) is not especially limited, and preferably 30 minutes to 8 hours, for example. The time taken for addition is more preferably 40 minutes to 6 hours, and still more preferably 60 minutes to 4 hours. Among these, the time taken for adding only the initiator is preferably 3 hours or less, and more preferably 2 hours or less, and still more preferably 1 hour or less.

It is also preferable that the above-mentioned copolymerization is performed under an acid condition. In this case, a copolymer with a low molecular weight can be produced well because increase in viscosity of the solution in the polymerization reaction system can be suppressed enough. Also, the polymerization reaction can proceed at a concentration higher than ever before. Therefore, the production efficiency can be considerably increased. In such a point, it is extremely advantageous that the copolymerization is performed under an acid condition. More preferably, the reaction solution is adjusted so as to have a pH of 1 to 6 at 25° C. during the polymerization. If the reaction solution has a pH of less than 1, corrosion on a device may be generated. If the reaction solution has a pH of 6, the weight average molecular weight may be insufficiently reduced. The reaction solution still more preferably has a pH of 1 to 5, and still more preferably 1 to 4.

It is preferable that a pH adjustor is used for such an acid condition. Examples of such a pH adjustor include organic acids or inorganic acids, such as hydrochloric acid, sulfuric acid, acetic acid, citric acid, and oxalic acid; alkali metal hydroxides, such as sodium hydroxide and potassium hydroxide; alkali earth metal hydroxides, such as a calcium hydroxide and magnesium hydroxide; organic amines, such as ammonia, monoethanolamine, and triethanolamine. One or two or more of them may be used. The reaction system may contain a heavy metal ion, preferably iron ion, in addition to the initiator. If the reaction system contains a heavy metal ion, the efficiency of the initiator is improved. Therefore, the copolymer can be efficiently synthesized in a small amount of the polymerization initiator.

The above-mentioned water-soluble polymer, wherein the water-soluble amphoteric copolymer shows a detergency of 17.0% or more in hard water 100 ppm if used as a detergent, is also one of the preferable embodiments of the present invention.

The above-mentioned hard water 100 ppm means a value (mg/L=ppm) obtained by converting an amount of calcium dissolving in water 1 L into a weigh (mg) of calcium carbonate ($CaCO_3$).

The above-mentioned detergency is a value calculated according to the following detergency test conditions.

(Detergency Test Conditions)

(1) A cotton cloth according to JIS L803:1998 obtained form Cleaning Science Association Foundation is cut into 5 cm×5 cm to prepare white clothes. Wet artificially stained clothes are also obtained from Japanese Standards Association. The white clothes and the stained clothes are previously measured for reflectance as whiteness using a calorimetric difference meter (produced by Nippon Denshoku Industries Co., Ltd., SE 2000 type).

(2) Pure water is added to calcium chloride dihydrate 0.294 g to prepare hard water 2000 g.

(3) A targotmeter is set at 25° C., and hard water 1000 mL, and a 1% by weight aqueous solution of water-soluble amphoteric copolymer on solid content equivalent basis 5.0 g are put in a pot.

If the water-soluble polymer of the above-mentioned embodiment preferable in the detergency is used, a targotmeter is set at 25° C., and hard water 1000 mL, a 5% by weight aqueous solution of sodium carbonate 4.0 g, a 5% by weight aqueous solution of LAS 4.0 g, zeolite 0.15 g, and a 1% by weight polymer aqueous solution on solid content equivalent basis 5.0 g are put in a pot. As mentioned above, the blending in the detergent is determined for performing the detergency test. Thereby, the detergency in hard water 100 ppm of the above-mentioned water-soluble amphoteric polymer as a detergent can be clearly determined.

(4) Thereto are put 7 sheets of the stained clothes and 7 sheets of the white clothes and stirring is performed at 100 rpm for 10 minutes.

(5) The white clothes are wringed by hand, and hard water 1000 mL is put in a pot and stirred is performed at 100 rpm for 2 minutes. This operation is performed two times.

(6) The white clothes and the stained clothes are pressed with a filler cloth to dry them while smoothing wrinkles. The dried white clothes and stained clothes are measured for reflectance again as whiteness with a colorimetric difference meter.

(7) From these measurements, the detergent ratio is determined by the following formula.

Detergent ratio (%)={(whiteness of stained cloth after cleaning−whiteness of stained cloth before cleaning)/(whiteness of original white cloth−whiteness of stained cloth before cleaning)}×100

The above-mentioned detergency in which the detergency in hard water 100 ppm is 17.0% or more, can be provided using the water-soluble amphoteric copolymer produced by the above-mentioned production method. The detergent containing the above-mentioned water-soluble amphoteric copolymer may be a liquid detergent or a powder detergent, and preferably is a liquid detergent, because the polymer is excellent in compatibility with a surfactant and can form a highly concentrated liquid detergent. With respect to the preferable embodiment of the monomer forming the water-soluble amphoteric copolymer capable of satisfying the above-mentioned detergency and the amount of each monomer component, the production method of the polymer may be appropriately determined, as mentioned above. JIS L0803 is a standard obtained by standardize an undyed cloth for staining using in color fastness test in Japanese Standards Association. The above-mentioned LAS stands for Linear Alkylbenzene Sulfonate, and the LAS aqueous solution means an aqueous solution of alkylbenzene sulfonate.

The water-soluble amphoteric copolymer of the present invention has excellent hydrophilicity and high adsorption capacity, and capable of exhibiting dramatically excellent dispersibility under high hardness conditions. Therefore, such a copolymer is preferably used in various applications such as water slurry dispersant for inorganic pigments, cement admixture, scale inhibitor, antirust, anticorrosives, detergent composition, surface soil inhibitor (finishing agent), water treatment agent, fiber treatment agent, deinking agent for used paper recycling, chelating agent, various dye dispersants, pesticide dispersant, detergent for refining cottons, and dispersant for coals (however, an antimicrobial agent is excluded because an antimicrobial agent is different from the above-mentioned applications such as detergent composition in the functional effects). Among them, such a copolymer is preferably used in a detergent composition, a surface soil inhibitor, a water treatment agent, and a dispersant because functional effects of the present invention can be even more exhibited. It is particularly preferable that the copolymer is used in a detergent composition, a water treatment agent, and a fiber treatment agent. Such a detergent composition comprising the water-soluble amphoteric copolymer is also part of the present invention. A water treatment agent and a fiber treatment agent comprising the water-soluble amphoteric copolymer is also one of preferable embodiments of the present invention.

If the detergent composition of the present invention comprises the above-mentioned water-soluble amphoteric copolymer, such a detergent composition can exhibit dramatically excellent detergency even under high hardness conditions. If the detergent composition of the present invention is the following detergent composition, such a detergent composition can exhibit functional effects of the present invention.

That is, the present invention includes a detergent composition comprising a water-soluble amphoteric copolymer, wherein the water-soluble amphoteric copolymer is produced by a copolymerization of a monomer component comprising a cationic monomer (a), an anionic monomer (b), and an unsaturated polyalkylene glycol monomer (c), and the monomer (b) comprises a carboxyl group-containing monomer and/or a sulfonic acid group-containing monomer (d).

Preferably used monomer components and content ratio, polymerization method and other preferable embodiments in the water-soluble amphoteric copolymer contained in such a detergent composition are as mentioned above in the above-mentioned water-soluble amphoteric copolymer. However, such a water-soluble amphoteric copolymer has no embodiment in which the content ratio in the above-mentioned monomer component (cationic monomer (a)/anionic monomer (b)/unsaturated polyalkylene glycol monomer (c)) is 1/1/1.

The detergent composition of the present invention comprises the above-mentioned water-soluble amphoteric copolymer. Specifically, such a detergent composition may comprise only the above-mentioned water-soluble amphoteric copolymer, or may contain another conventionally used detergent additive such as a detergent builder. The above-mentioned another conventionally used detergent builder is not especially limited, and may be sodium tripolyphosphate, sodium pyrophosphate, sodium silicate, Glauber's salt, sodium carbonate, sodium nitrilotriacetate, sodium or potassium ethylenediaminetetraacetic acid, zeolite, carboxyl derivatives of polysaccharides, water-soluble polymers such as (meth)acrylic acid (co)polymer salt, and fumaric acid (co) polymer salt. One or two or more species of them may be used.]

The above-mentioned detergent composition is blended to a detergent (cleaning agent) and then used, as a particularly preferable embodiment of the above-mentioned detergent composition. Thereby, the functional effects of the present invention are sufficiently exhibited, that is, such a detergent composition can sufficiently prevent dye transfer and redeposition due to hydrophobic soils, and thereby exhibit high detergency. Such a detergent comprising the detergent composition is part of the present invention.

The content ratio of the detergent composition of the present invention in the above-mentioned detergency is preferably determined such that the above-mentioned water-soluble amphoteric copolymer is 0.1 to 40% by weight in 100% by weight of the detergent. If the content ratio is less than 0.1% by weight, the detergent may exhibit insufficient detergent performances. If the content ratio is more than 40% by weight, the detergent may be economically inefficient. The content ratio is more preferably 0.2 to 30% by weight.

The above-mentioned detergent preferably contains a surfactant in addition to the above-mentioned detergent composition. Examples of such a surfactant include anionic surfactants, nonionic surfactants, cationic surfactants, and amphoteric surfactants. One or two or more species of them may be used.

Examples of the above-mentioned anionic surfactants include alkylbenzene sulfonates, alkyl or alkenyl ether sulfates, alkyl or alkenyl sulfates, α-olefin sulfonates, α-sulfo-fatty acids or ester salts thereof, alkane sulfonates, saturated or unsaturated fatty acid salts, alkyl or alkenyl ether carboxylates, amino acid surfactants, N-acylamino acid surfactants, and, alkyl or alkenyl phosphate or salts thereof. The alkyl group or the alkenyl group of such anionic surfactants may have a branched structure of the alkyl group such as a methyl group.

Examples of the above-mentioned nonionic surfactants include polyoxyalkylene alkyl or alkenyl ethers, polyoxyethylene alkyl phenyl ethers, higher fatty acid alkanol amides or alkylene oxide adducts thereof, sucrose fatty acid esters, alkyl glycoxides, fatty acid glycerin monoesters, and alkylamine oxides. The alkyl group or the alkenyl group of such nonionic surfactants may have a branched structure of the alkyl group such as a methyl group.

Quarternary ammonium salts may be mentioned as the above-mentioned cationic surfactants. Carboxyl type or sulfobetaine type amphoteric surfactants may be mentioned as the above-mentioned amphoteric surfactants.

The content ratio of the surfactant in the above-mentioned detergent is preferably 1 to 70% by weight in 100% by weight of the detergent. If the content ratio is less than 1% by weight, the detergent may insufficiently exhibit detergent performances. If the content ratio is more than 70% by weight, the detergent may be economically inefficient. The content ratio is more preferably 15 to 60% by weight.

The above-mentioned detergent may further contain conventionally used additives or solvents such as dye transfer inhibitor, fluorescent whitening agent, foaming agent, foam inhibitor, anticorrosive, antirust, soil suspension, soil release agent, pH adjustor, fungicide, chelating agent, viscosity modifier, enzyme, enzyme stabilizer, perfume, fiber softener, peroxide, peroxide stabilizer, fluorescence agent, coloring agent, foam stabilizer, lustering agent, bleaching agent, and dye. One or two or more species of them may be contained. The content may be appropriately determined depending on needed performance and the like.

The detergent of the present invention may be a liquid detergent or a powder detergent, and preferably is a liquid detergent because the detergent is excellent in compatibility with a surfactant and can be a highly concentrated liquid detergent. As mentioned above, an embodiment in which the above-mentioned detergent is a liquid detergent, that is, a liquid detergent comprising the detergent composition, is also part of the present invention.

Preferable embodiments of the above-mentioned liquid detergent are as mentioned above in the detergent.

The water treatment agent and the fiber treatment agent of the present invention can exhibit dramatically excellent detergency under high hardness conditions if each of them contains the above-mentioned water-soluble amphoteric copolymer of the present invention. The water-treatment agent and fiber treatment agent of the present invention can exhibit functional effects of the present invention in the following configurations. That is, the present invention includes a water treatment agent comprising a water-soluble amphoteric copolymer, wherein the water-soluble amphoteric copolymer is produced by a copolymerization of a monomer component comprising a cationic monomer (a), an anionic monomer (b), and an unsaturated polyalkylene glycol monomer (c), and the monomer (b) comprises a carboxyl group-containing monomer and/or a sulfonic acid group-containing monomer (d).

The present invention also includes a fiber treatment agent comprising a water-soluble amphoteric copolymer, wherein the water-soluble amphoteric copolymer is produced by a copolymerization of a monomer component comprising a cationic monomer (a), an anionic monomer (b), and an unsaturated polyalkylene glycol monomer (c), and the monomer (b) comprises a carboxyl group-containing monomer and/or a sulfonic acid group-containing monomer (d).

Preferably used monomer components and content ratio, polymerization method and other preferable embodiments in the water-soluble amphoteric copolymer contained in such a water treatment agent and fiber treatment agent are as mentioned above in the above-mentioned water-soluble amphoteric copolymer.

The water-soluble amphoteric copolymer of the present invention has the above-mentioned configuration. Such a water-soluble amphoteric copolymer has excellent hydrophilicity and high adsorption capability, and is capable of exhibiting dramatically excellent dispersibility even under high hardness conditions. Therefore, such a water-soluble amphoteric copolymer can be preferably used in various applications such as detergent composition, surface soil inhibitor, water treatment agent, and dispersant. And such a water-soluble amphoteric copolymer can exhibit high detergency particularly if used in a detergent composition application.

BEST MODE FOR CARRYING OUT THE INVENTION

The present invention will, hereinafter, be described in more detail with reference to Examples, but the present invention is not limited to these Examples. The terms, "part" and "%" represent "part by weight" and "% by weight", respectively, unless otherwise specified.

The weight average molecular weight in the following Examples and Comparative Example was measured by the above-mentioned method.

The detergent ratio was determined under the following test conditions.

(Conditions of Detergency Test)

(1) A cotton cloth according to JIS L803:1998 obtained form Cleaning Science Association Foundation was cut into 5 cm×5 cm to prepare white clothes. Wet artificially stained clothes were also obtained from Japanese Standards Association. The white clothes and the stained clothes were previously measured for reflectance as whiteness using a calorimetric difference meter (produced by Nippon Denshoku Industries Co., Ltd., SE 2000 type).

(2) Pure water was added to calcium chloride dihydrate 0.294 g to prepare hard water 2000 g.

(3) A targotmeter was set at 25° C., and hard water 1000 mL, a 5% by weight aqueous solution of sodium carbonate 4.0 g, a 5% by weight aqueous solution of LAS 4.0 g, zeolite 0.15 g, and a 1% by weight polymer aqueous solution on solid content equivalent basis 5.0 g were put in a pot.

(4) Thereto were put 7 sheets of the stained clothes and 7 sheets of the white clothes and stirring was performed at 100 rpm for 10 minutes.

(5) The white clothes were wringed by hand, and hard water 1000 mL was put in a pot and stirred was performed at 100 rpm for 2 minutes. This operation was performed two times.

(6) The white clothes and the stained clothes were pressed with a filler cloth to dry them while smoothing wrinkles. The dried white clothes and stained clothes were measured for reflectance again as whiteness with a calorimetric difference meter.

(7) From these measurements, the detergent ratio was determined by the following formula.

Detergent ratio (%)={(whiteness of stained cloth after cleaning−whiteness of stained cloth before cleaning)/(whiteness of original white cloth−whiteness of stained cloth before cleaning)}×100

EXAMPLE 1

Into a 2.5 L SUS separable flask equipped with a reflux condenser and a stirrer were charged pure water 710 g, and the pure water was heated to 90° C. under stirring.

Then, thereto were added dropwise 60% (N,N-dimethylamino)ethyl methacrylate (hereinafter, abbreviated as "4DAM") 38.1 g, 50% methoxypolyethylene oxide methacrylate (the number of addition of EO: 23 mol) (hereinafter, abbreviated as "PGME") 241.6 g, 25% 2-acrylamide-2-methylpropane sulfonic acid (hereinafter, abbreviated as "AMPS") 54.7 g, a 10% aqueous solution of sodium persulfate (hereinafter, abbreviated as "NaPS") 34.3 g, and 40% mercaptopropionic acid (hereinafter abbreviated as "MPA") 11.8 g from separate drop nozzles simultaneously. The dropwise addition was continuously performed, and the rate of the dropwise addition was kept constant. The 60% DAM, 50% PGME, 25% AMPS, 40% MPA were added dropwise for 180 minutes, the 10% NaPS for 190 minutes.

After the 10% NaPS had been added dropwise, the reaction solution was matured at 90° C. for 60 minutes and the polymerization was completed. Upon termination of the polymerization, the polymerization reaction solution was cooled to obtain a copolymer (1) aqueous solution. Table 1 shows various results in Example 1.

EXAMPLE 2

Into a 2.5 L SUS separable flask equipped with a reflux condenser and a stirrer were charged pure water 690 g, and the pure water was heated to 90° C. under stirring.

Then, thereto were added dropwise 25% 4DAM 74.8 g, 50% PGME 66.7 g, 30% acrylic acid (hereinafter, abbreviated as "AA") 43.2 g, 10% NaPS 36.0 g, and 15% MPA 33.0 g from separate drop nozzles simultaneously. The dropwise addition was continuously performed, and the rate of the dropwise addition was kept constant. The 25% 4DAM, 50% PGME, 30% AA, 15% MPA were added dropwise for 180 minutes, the 10% NaPS for 190 minutes.

After the 10% NaPS had been added dropwise, the reaction solution was matured at 90° C. for 60 minutes and the polymerization is completed. Upon termination of the polymerization, the polymerization reaction solution was cooled to obtain a copolymer (2) aqueous solution. Table 1 shows various results in Example 2.

EXAMPLE 3

Into a 2.5 L SUS separable flask equipped with a reflux condenser and a stirrer were charged pure water 660 g, and the pure water was heated to 90° C. under stirring. Then, thereto were added dropwise 60% 4DAM 38.1 g, 50% PGME 241.6 g, 10% AMPS 38.4 g, 80% AA 1.7 g, 10% NaPS 30.8 g, and 40% MPA 10.6 g from separate drop nozzles simultaneously. The dropwise addition was continuously performed, and the rate of the dropwise addition was kept constant. The 60% 4DAM, 50% PGME, 10% AMPS, 80% AA, 40% MPA were added dropwise for 180 minutes, the 10% NaPS for 190 minutes.

After the 10% NaPS had been added dropwise, the reaction solution was matured at 90° C. for 60 minutes to complete the polymerization. Upon termination of the polymerization, the polymerization reaction solution was cooled to obtain a copolymer (3) aqueous solution. Table 1 shows various results in Example 3.

Comparative Example 1

Into a 2.5 L SUS separable flask equipped with a reflux condenser and a stirrer were charged pure water 630 g, and the pure water was heated to 90° C. under stirring. Then, thereto was added dropwise 60% 4DAM 38.1 g, 50% PGME 241.6 g, 15% AA 53.3 g, 10% NaPS 30.8 g, 40% MPA 10.6 g, from separate drop nozzles simultaneously. The dropwise addition was continuously performed, and the rate of the dropwise addition was kept constant. The 60% 4DAM, 50% PGME, 15% AA, 40% MPA were added dropwise for 180 minutes, the 10% NaPS for 190 minutes.

After the 10% NaPS had been added dropwise, the reaction solution was matured at 90° C. for 60 minutes and the polymerization was completed. Upon termination of the polymerization, the polymerization reaction solution was cooled to obtain a copolymer (4) aqueous solution. Table 1 shows various results in Comparative Example 1.

From the above results, the water-soluble amphoteric copolymer of the present invention preferably has a detergent ratio measured under the above-mentioned detergency test conditions of 17.0 (%) or more, and still more preferably 19.0 (%) or more.

TABLE 1

|  | Example 1 | Example 2 | Example 3 | Comparative Example 1 |
|---|---|---|---|---|
|  |  |  | Copolymer |  |
|  | (1) | (2) | (3) | (4) |
| Charged composition ratio (mol %) | 4DAM/PGME/AMPS = 38/38/24 | 4DAM/PGME/AA = 30/10/60 | 4DAM/PGME/AMPS/AA = 43/43/7/7 | 4DAM/PGME/AA = 43/43/14 |
| Weight average molecular weight | 5800 | 4400 | 5500 | 6000 |
| Detergent ratio (%) | 19.3 | 17.0 | 19.0 | 16.5 |

The present application claims priority under Article 4 of the Paris Convention to Japanese Patent Application No. 2005-200372 filed in Japan on Jul. 8, 2005, entitled "WATER-SOLUBLE AMPHOTERIC COPOLYMER, PRODUCTION METHOD THEREOF AND APPLICATION THEROF", the entire contents of which are herein incorporated by reference.

The invention claimed is:

1. A water-soluble amphoteric copolymer produced by a copolymerization of a monomer component comprising a cationic monomer (a), an anionic monomer (b), and an unsaturated polyalkylene glycol monomer (c),
   wherein the monomer (b) comprises a carboxyl group-containing monomer and optionally a sulfonic acid group-containing monomer (d), and the carboxyl group-containing monomer is more than 60% by mole relative to 100% by mole of a total amount of the monomers (a), (b), and (c), and
   the sulfonic acid group-containing monomer (d) is 3 to 30% by mole relative to 100% by mole of a total amount of the monomers (a), (d), and (c) if the anionic monomer (b) also comprises the sulfonic acid group-containing monomer (d), and the water-soluble amphoteric copolymer is produced by using a polymerization initiator and a chain transfer agent, and the chain transfer agent is 30 to 300% by weight relative to 100% by weight of the polymerization initiator.

2. The water-soluble amphoteric copolymer according to claim 1,
   wherein the cationic monomer (a) is an amino group-containing monomer.

3. The water-soluble amphoteric copolymer according to claim 2,
   wherein the amino group-containing monomer is at least one species of monomer selected from the group consisting of (N,N-dimethylamino)ethyl (meth)acrylate, (meth)acryloyloxyethyltrimethylammonium halides, and (meth)acryloyloxyethyltrimethylammonium sulfate.

4. The water-soluble amphoteric copolymer according to claim 1,
   wherein the sulfonic acid group-containing monomer (d) is at least one species of monomer selected from the group consisting of 2-acrylamide-2-methylpropanesulfonic acid and salts thereof, 3-(meth)allyloxy-2-hydroxypropanesulfonic acid and salts thereof, and 3-(meth)allyloxy-1-hydroxypropane-2-sulfonic acid and salts thereof.

5. The water-soluble amphoteric copolymer according to claim 1,
   wherein the water-soluble amphoteric copolymer shows a detergency of 17.0% or more in hard water 100 ppm if used as a detergent.

6. A detergent composition comprising the water-soluble amphoteric copolymer according to claim 1.

7. A detergent comprising the detergent composition according to claim 6, and conventional detergent additives.

8. A liquid detergent comprising the detergent composition according to claim 6.

9. The water-soluble amphoteric copolymer according to claim 1, wherein the water-soluble amphoteric copolymer has a weight average molecular weight of 2000 to 50000.

10. A water treatment agent comprising the water-soluble amphoteric copolymer according to claim 1.

11. A fiber treatment agent comprising the water-soluble amphoteric copolymer according to claim 1.

* * * * *